(12) United States Patent
Forster

(10) Patent No.: US 11,347,992 B2
(45) Date of Patent: May 31, 2022

(54) RFID STRAPS WITH A TOP AND BOTTOM CONDUCTOR

(71) Applicant: Avery Dennison Retail Information Services, LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/389,284

(22) Filed: Apr. 19, 2019

(65) Prior Publication Data

US 2019/0325284 A1 Oct. 24, 2019

Related U.S. Application Data

(60) Provisional application No. 62/660,510, filed on Apr. 20, 2018.

(51) Int. Cl.
| | | |
|---|---|---|
| *H01Q 9/06* | (2006.01) | |
| *G06K 19/07* | (2006.01) | |
| *G06K 19/077* | (2006.01) | |

(52) U.S. Cl.
CPC ... *G06K 19/07773* (2013.01); *G06K 19/0716* (2013.01); *G06K 19/0723* (2013.01)

(58) Field of Classification Search
CPC .............. H01Q 9/065; G06K 19/0716; G06K 19/0723; G06K 19/07773
USPC .......................................................... 235/492
See application file for complete search history.

(56) References Cited

U.S. PATENT DOCUMENTS

| | | |
|---|---|---|
| D383,465 S | 9/1997 | Chen |
| 6,142,381 A | 11/2000 | Finn et al. |
| 7,214,569 B2 | 5/2007 | Swindlehurst et al. |
| D546,819 S | 7/2007 | Oliver |
| D553,124 S | 10/2007 | Joughin et al. |
| 7,471,173 B2 | 12/2008 | Hidaka et al. |
| 7,500,610 B1 | 3/2009 | Hadley et al. |
| 7,535,366 B2 | 5/2009 | Egbert et al. |

(Continued)

FOREIGN PATENT DOCUMENTS

| | | |
|---|---|---|
| CN | 102119395 | 7/2011 |
| CN | 104541316 | 4/2015 |

(Continued)

OTHER PUBLICATIONS

International Preliminary Report on Patentability dated Jul. 11, 2019 issued in corresponding IA No. PCT/US2017/068659 filed Dec. 28, 2017.

(Continued)

*Primary Examiner* — Toan C Ly
(74) *Attorney, Agent, or Firm* — Avery Dennison Retail Information Services LLC.

(57) ABSTRACT

A method of incorporating a second conductor into a RFID strap device and the resulting device in multiple embodiments is disclosed. The second conductor adds functionality via coupling between the strap conductor and the second conductor. The functionality added can be a secondary antenna operating at a different frequency than the first antenna that is driven by the strap pads, a sensing capability, a drive for an emissive device such as an LED, or an interface to one or more semiconductor devices mounted onto the second conductor.

19 Claims, 13 Drawing Sheets

(56) References Cited

U.S. PATENT DOCUMENTS

| | | | |
|---|---|---|---|
| D634,738 S | 3/2011 | Lim et al. | |
| 8,289,165 B2 | 10/2012 | Forster | |
| 8,473,235 B2 | 6/2013 | Kittel et al. | |
| 8,511,569 B1 | 8/2013 | Koepp et al. | |
| D697,900 S | 1/2014 | Yang et al. | |
| D716,774 S | 11/2014 | Forster et al. | |
| 9,070,563 B2 | 6/2015 | Yamazaki et al. | |
| 9,378,451 B2 | 6/2016 | Forster | |
| 9,418,262 B1 | 8/2016 | Gentile et al. | |
| 9,595,211 B2 | 3/2017 | Lim et al. | |
| D809,489 S | 2/2018 | Burkholder et al. | |
| D812,045 S | 3/2018 | Howard | |
| D826,220 S | 8/2018 | He | |
| D837,769 S | 1/2019 | Yang | |
| 10,186,765 B2 | 1/2019 | Coleman et al. | |
| 10,243,255 B2 | 3/2019 | Rokhsaz et al. | |
| 10,268,945 B1 | 4/2019 | Keller et al. | |
| 10,311,355 B1 | 6/2019 | Hahn et al. | |
| D855,039 S | 7/2019 | Naweed | |
| D880,460 S | 4/2020 | Forster | |
| 10,665,922 B2 | 5/2020 | Takahashi | |
| 2002/0157411 A1 | 10/2002 | Ishikawa et al. | |
| 2004/0089707 A1 | 5/2004 | de Cortina et al. | |
| 2005/0001785 A1 | 1/2005 | Ferguson et al. | |
| 2005/0091996 A1 | 5/2005 | Ishikawa et al. | |
| 2006/0043198 A1* | 3/2006 | Forster | G06K 19/07756 235/492 |
| 2006/0044192 A1 | 3/2006 | Egbert | |
| 2006/0054710 A1 | 3/2006 | Forster et al. | |
| 2006/0145872 A1 | 7/2006 | Tanaka et al. | |
| 2007/0063057 A1 | 3/2007 | Masubuchi et al. | |
| 2007/0069859 A1 | 3/2007 | Bae et al. | |
| 2007/0132593 A1 | 6/2007 | Yamazaki | |
| 2007/0171129 A1 | 7/2007 | Coleman et al. | |
| 2007/0194935 A1 | 8/2007 | Ayala et al. | |
| 2007/0238245 A1 | 10/2007 | Cote et al. | |
| 2008/0105673 A1 | 5/2008 | Ikeda et al. | |
| 2008/0122631 A1 | 5/2008 | Kodukula et al. | |
| 2008/0143480 A1* | 6/2008 | Egbert | H04B 5/0062 340/10.1 |
| 2008/0220721 A1 | 9/2008 | Downie et al. | |
| 2009/0109002 A1 | 4/2009 | Hadley et al. | |
| 2009/0179817 A1 | 7/2009 | Yin | |
| 2009/0236334 A1 | 9/2009 | Ben-Shmuel et al. | |
| 2009/0309703 A1 | 12/2009 | Forster | |
| 2010/0000980 A1 | 1/2010 | Popescu | |
| 2010/0117819 A1 | 5/2010 | Murray | |
| 2010/0141452 A1 | 6/2010 | Lian et al. | |
| 2010/0213187 A1 | 8/2010 | Bandholz et al. | |
| 2011/0133904 A1 | 6/2011 | Warther | |
| 2011/0147467 A1 | 6/2011 | Choi | |
| 2012/0061473 A1 | 3/2012 | Forster et al. | |
| 2012/0062367 A1 | 3/2012 | Warther | |
| 2012/0111950 A1 | 5/2012 | Worrall et al. | |
| 2013/0002404 A1 | 1/2013 | Takeoka et al. | |
| 2013/0087625 A1 | 4/2013 | Kato | |
| 2013/0306626 A1 | 11/2013 | Torres et al. | |
| 2013/0313328 A1 | 11/2013 | Mohajer-Iravani et al. | |
| 2014/0034739 A1 | 2/2014 | Forster et al. | |
| 2015/0076238 A1 | 3/2015 | Koskelainen | |
| 2015/0144702 A1* | 5/2015 | Mei | G06K 19/07722 235/488 |
| 2016/0003895 A1 | 1/2016 | Farr et al. | |
| 2017/0214142 A1 | 8/2017 | Rokhsaz et al. | |
| 2018/0092486 A1 | 4/2018 | Kwon et al. | |
| 2018/0189623 A1 | 7/2018 | Forster et al. | |
| 2019/0325282 A1 | 10/2019 | Forster et al. | |
| 2020/0005110 A1 | 1/2020 | Forster | |
| 2020/0160005 A1 | 5/2020 | Volpi et al. | |

FOREIGN PATENT DOCUMENTS

| | | |
|---|---|---|
| CN | 208423178 U | 1/2019 |
| CN | 109389203 | 2/2019 |
| EP | 1174667 | 1/2002 |
| EP | 1479619 | 11/2004 |
| EP | 2306588 | 4/2011 |
| GB | 2554952 | 4/2018 |
| JP | 2001-317741 | 11/2001 |
| JP | 2002-150248 | 5/2002 |
| JP | 2003-087044 | 3/2003 |
| JP | 2005-252853 | 9/2005 |
| JP | 2006-132793 | 5/2006 |
| JP | 2007-086863 | 4/2007 |
| JP | 2007-089054 | 4/2007 |
| JP | 2010-045467 | 2/2010 |
| JP | 2011-227668 | 11/2011 |
| JP | 2016-532901 | 10/2016 |
| WO | 2002/099764 | 12/2002 |
| WO | 2006/048964 | 11/2006 |
| WO | 2008/084917 | 7/2008 |
| WO | 2011/159716 | 12/2011 |
| WO | 2014/210000 | 12/2014 |
| WO | 2017/094794 | 6/2017 |
| WO | 2017/126418 | 7/2017 |
| WO | 2018/125977 | 7/2018 |

OTHER PUBLICATIONS

International Search Report and Written Opinion dated Oct. 1, 2019 issued in corresponding IA No. PCT/US2019/039485 filed Jun. 27, 2019.

International Preliminary Report on Patentability dated Oct. 20, 2020 issued in corresponding IA No. PCT/US2019/028281 filed Apr. 19, 2019.

International Search Report and Written Opinion dated Aug. 5, 2019 issued in corresponding IA No. PCT/US2019/028281 filed Apr. 19, 2019.

International Search Report and Written Opinion dated Oct. 11, 2019 issued in corresponding IA No. PCT/US2019/039460 filed Jun. 27, 2019.

International Search Report and Written Opinion dated Jun. 8, 2018 issued in corresponding IA No. PCT/US2017/068659 filed Dec. 28, 2017.

International Preliminary Report on Patentability dated Oct. 29, 2020 issued in corresponding IA No. PCT/US2019/028275 filed Apr. 19, 2019.

International Search Report and Written Opinion dated Jul. 12, 2019 issued in corresponding IA No. PCT/US2019/028275 filed Apr. 19, 2019.

International Search Report and Written Opinion dated Sep. 10, 2019 issued in corresponding IA No. PCT/US2019/028268 filed Apr. 19, 2019.

International Preliminary Report on Patentability dated Oct. 29, 2020 issued in corresponding IA No. PCT/US2019/028268 filed Apr. 19, 2019.

International Search Report and Written Opinion dated Mar. 31, 2021 issued in corresponding IA No. PCT/US2020/067168 filed Dec. 28, 2020.

International Search Report and Written Opinion dated Mar. 30, 2021 issued in corresponding IA No. PCT/US2020/067115 filed Dec. 28, 2020.

International Preliminary Report on Patentability dated Dec. 29, 2020 issued in corresponding IA No. PCT/US2019/039485 filed Jun. 27, 2019.

International Preliminary Report on Patentability dated Dec. 29, 2020 issued in corresponding IA No. PCT/US2019/039460 filed Jun. 27, 2019.

* cited by examiner

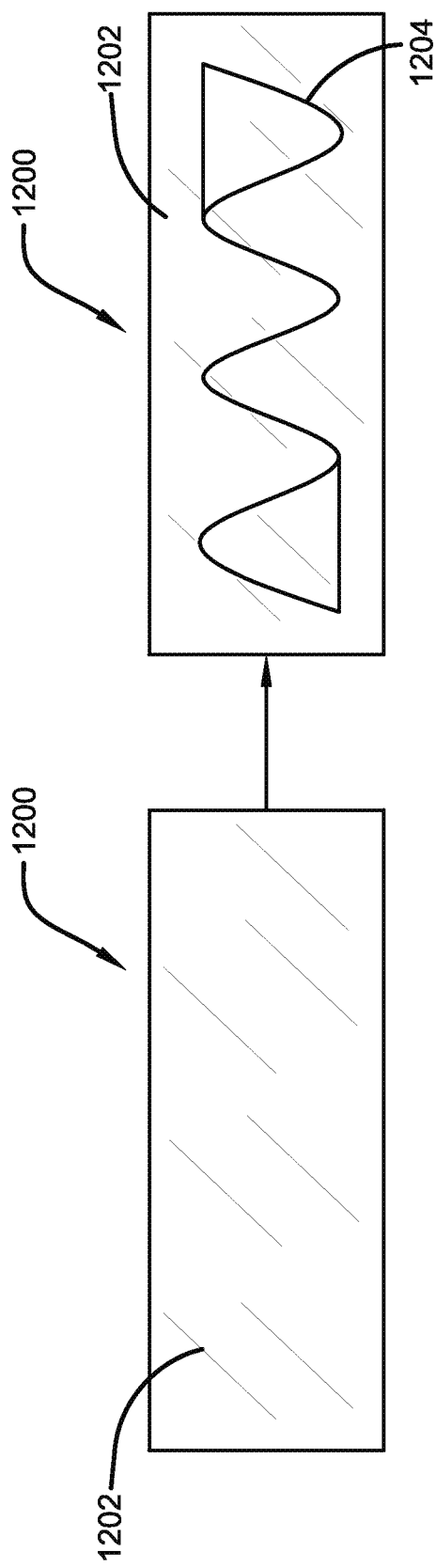
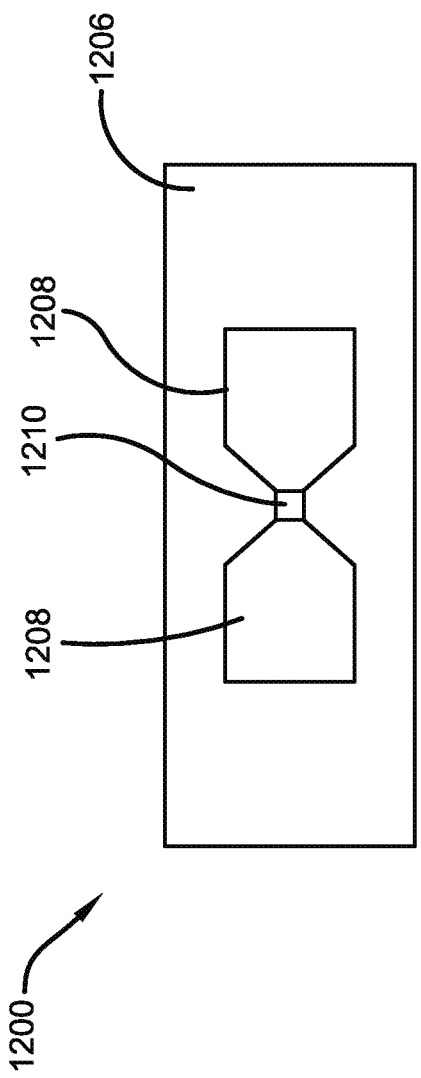

RFID STRAPS WITH A TOP AND BOTTOM CONDUCTOR

CROSS REFERENCE TO RELATED APPLICATION(S)

The present application claims priority to and the benefit of U.S. provisional utility patent application No. 62/660,510 filed Apr. 20, 2018, which is incorporated herein by reference in its entirety.

BACKGROUND

The present invention relates generally to a method of incorporating a second conductor into a radio-frequency identification ("RFID") strap device, and the resulting device. Specifically, the method and resulting device allows for the coupling between the second conductor and the strap conductor which adds functionality to the RFID strap device. The present method is especially suitable for RFID strap devices. Accordingly, the present specification makes specific reference thereto. However, it is to be appreciated that aspects of the present inventive method are also equally amenable to other like applications and devices.

Radio-frequency identification uses magnetic, electric, or electromagnetic fields transmitted by a reader system to identify itself and, in some cases, provide additionally stored data. RFID tags typically include a semiconductor device commonly called the "chip" on which are formed a memory and operating circuitry. The RFID chip is connected to an antenna, either directly or with an RFID strap device, as is known in the art. Typically, RFID tags act as transponders, providing information stored in the chip memory in response to a radio frequency ("RF") interrogation signal received from a reader, also referred to as an interrogator. In the case of active RFID devices, the device has a power source such as a battery. With passive RFID devices, on the other hand, the energy of the interrogation signal also provides the necessary energy to operate the RFID device. Thus, although passive RFID devices may have a shorter read range compared to active RFID devices, they are much less expensive and do not have a limited life time (e.g., due to limits on battery life) as with active RFID devices.

RFID tags may be incorporated into and/or attached to articles that one desires to be tracked. In some cases, the tag may be attached to the outside of an article with adhesive, tape, or other means known in the art and, in other cases, the tag may be inserted within the article, such as being included in the packaging, located within the container of the article, or sewn into a garment. The RFID tags may be manufactured with a unique identification number, which in one embodiment is a simple serial number of several bytes with a check digit attached. This identification number is often incorporated into the tag during manufacture. The user in most cases cannot alter this serial/identification number and manufacturers guarantee that each serial number is used only once. Such read-only RFID tags typically are permanently attached to an article to be tracked and, once attached, the serial number of the tag is associated with its host article in a computer data base.

The present invention discloses a method of incorporating at least one additional conductor in addition to the conductor already within the RFID strap device, into a RFID strap device, and the strap conductor and the at least one additional conductor are coupled together to add functionality. In one embodiment, the functionality can include the at least one additional conductor acting as a secondary antenna operating at a different frequency to the first antenna driven by the strap conductor, the second conductor providing sensing capability to the device, the second conductor driving an emissive device, or the second conductor interfacing to one or more semiconductor devices mounted onto the second conductor.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a method of incorporating a second conductor into an RFID strap device and the resulting device. The RFID strap device comprises a top (or second) conductor coupled to a strap (or first) conductor via a separating dielectric. The RFID strap device is also coupled to a separate antenna on a base substrate. The antenna can be made of any suitable material known in the art, such as aluminum foil, and the base substrate is typically comprised of paper. Alternate materials may be used for the base substrate, however, as will be appreciated by a person of ordinary skill in the art.

In a preferred embodiment, a second antenna formed on the top conductor operates at a higher frequency compared to a first antenna which is coupled to the strap conductor. The top conductor is also coupled to the RFID strap device; thus the RFID strap device can communicate at a second (or higher) frequency or harvest energy to increase the performance, such as the read range, of the RFID chip at a first frequency.

Additionally, in another embodiment, the top conductor is employed as an emissive device, for example driving an LED (light emitting diode), etc. The top conductor is coupled to the RFID strap device via a pair of strap pads or other suitable component, which allows the RFID strap device to drive the LED as well.

In another embodiment, the top conductor is connected to a semiconductor device. Then, the coupling of the top conductor to the RFID strap device via the pair of strap pads or other suitable component provides such beneficial effects as communication of data, power, or clock frequencies, etc. For example, the semiconductor device can act as a Bluetooth beacon, where the 2.45 GHz transmission uses the top conductor as an antenna, and the power or data received by the RFID strap device via the first antenna will control and/or power the beacon.

According to some embodiments of the present disclosure, a radio-frequency identification (RFID) tag comprises an RFID strap device, which comprises a first strap conductor comprising a pair of strap pads and an RFID chip, a second conductor, a dielectric positioned between the first strap conductor and the second conductor, and an antenna coupled to the RFID strap device.

In some embodiments, the antenna of the RFID tag is located on a base substrate. In some embodiments, the antenna operates at a first frequency. In further embodiments, the second conductor functions as a second antenna, which in some embodiments operates at a frequency that differs from the first frequency of the antenna. In some embodiments, the second conductor is coupled to the first strap conductor via capacitance through the dielectric. In other embodiments, the second conductor is coupled to the first strap conductor via direct ohmic connection means, which in some embodiments include mechanical crimping, electrochemical processes, or one or more holes filled with conductive ink.

According to other embodiments of the present disclosure, a radio-frequency identification (RFID) strap device is coupled to a first antenna and comprises a first strap conductor comprised of a pair of strap pads connected to an RFID chip, a second conductor comprised of a second antenna, and a dielectric positioned between the first strap conductor and the second conductor, wherein the second antenna is configured to operate at a frequency different than the first antenna.

In some embodiments, the second antenna of the RFID strap device is coupled to the RFID chip, and in some embodiments the second antenna increases impedance match between the RFID chip and the first antenna. In some embodiments, the second conductor is coupled to a sensing device, in other embodiments the second conductor is coupled to an emissive device, and in other embodiments still the second conductor is coupled to a semiconductor device. In some embodiments, the second conductor is printed with conductive ink.

The present disclosure also contemplates a method of incorporating a second conductor into a radio-frequency identification (RFID) strap device comprising the steps of providing a first strap conductor comprised of a pair of strap pads, connecting an RFID chip to said pair of strap pads, positioning a dielectric between the first strap conductor and the second conductor, and coupling the RFID strap device to an antenna.

In some embodiments, the method further comprises forming a second antenna on the second conductor. In some embodiments, the method further comprises operating the second antenna at a frequency different than the antenna. In some embodiments, the method further comprises coupling the second conductor to a sensing device, while in other embodiments, the method comprises coupling the second conductor to an emissive device.

BRIEF DESCRIPTION OF THE DRAWINGS

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the accompanying drawings, in which:

FIG. 12A illustrates a top perspective view of the RFID strap device wherein the top conductor is an un-patterned strap conductor in accordance with the disclosed architecture;

FIG. 12B illustrates a top perspective view of the RFID strap device wherein the top conductor is modified by a laser before or after attachment of the RFID strap and antenna in accordance with the disclosed architecture;

FIG. 12C illustrates a bottom perspective view of the RFID strap device wherein the bottom conductor is coupled to the strap and RFID chip in accordance with the disclosed architecture;

DETAILED DESCRIPTION

Figure 1A:
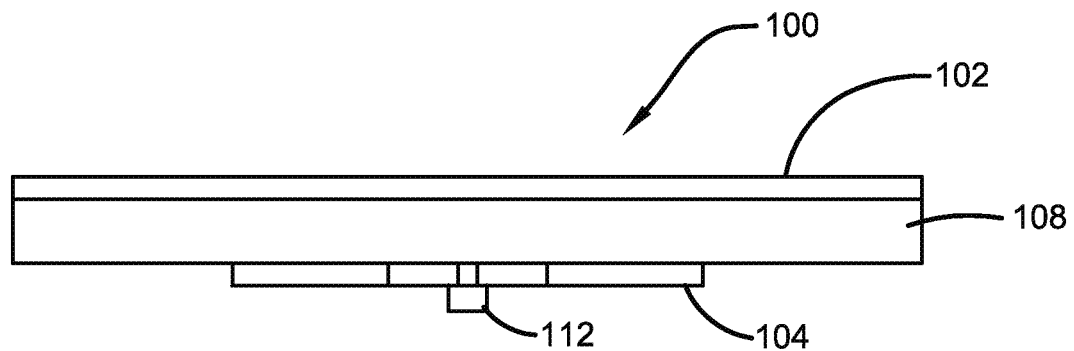
FIG. 1A illustrates a side perspective view of a RFID strap device with an additional conductor in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

According to the present disclosure, a method of incorporating a second conductor into a RFID strap device, wherein the strap conductor and the second conductor are coupled together to add functionality, is provided. The functionality added can be a secondary antenna operating at a different frequency to the first antenna that is driven by the strap pads, a sensing capability, a drive to an emissive device such as an LED, or an interface to one or more semiconductor devices mounted onto the second conductor.

Figure 1B:
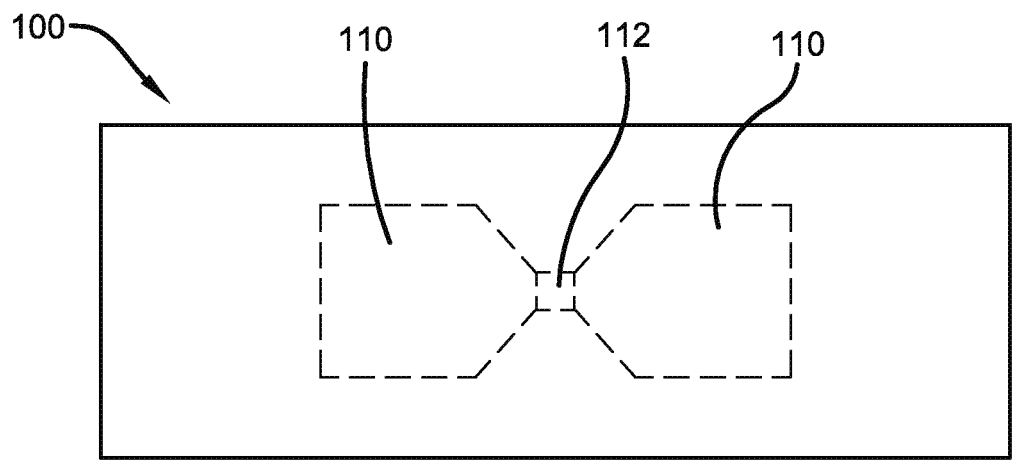
FIG. 1B illustrates a top perspective view of the RFID strap device with an additional conductor in accordance with the disclosed architecture.
Figure 2:
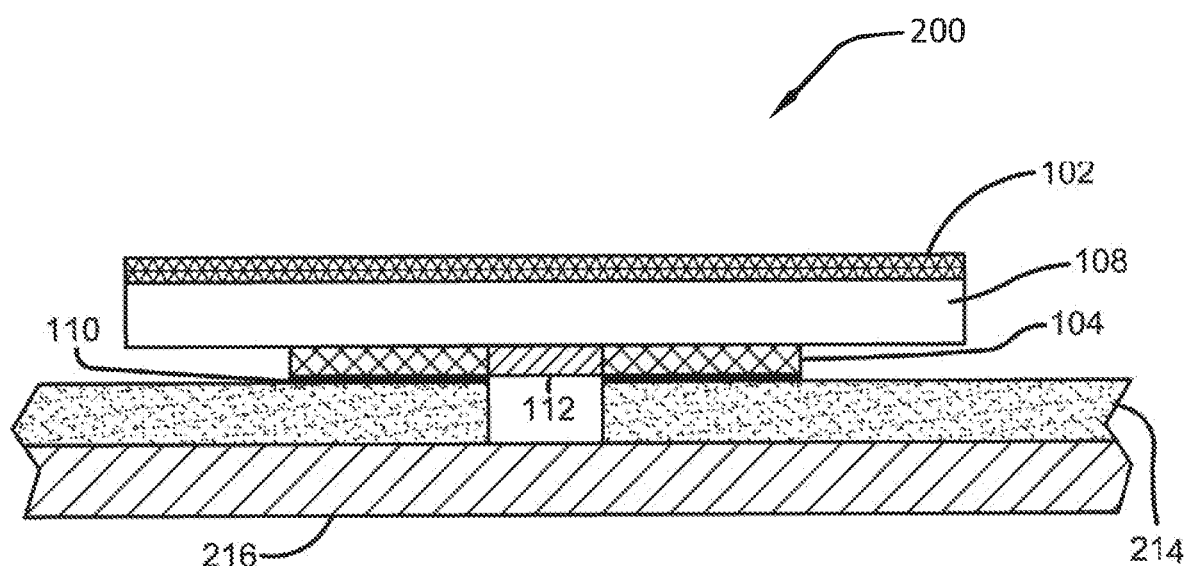
FIG. 2 illustrates a side perspective view of a RFID tag incorporating one embodiment of the RFID strap device of the present disclosure with an antenna and base layer coupled thereto in accordance with the disclosed architecture.

Referring initially to the drawings, FIGS. 1A-B and 2 illustrate an RFID strap device 100 that incorporates a second conductor 102. Specifically, the RFID strap device 100 comprises a first (or strap) conductor 104 and a second (or top) conductor 102 with a dielectric 108 positioned between the first conductor 104 and the second conductor 102. The first conductor 104 and the second conductor 102 can be any suitable conductors that are known in the art, for example an aluminum foil, a copper foil, or a printed conductive ink.

Further, the first conductor 104 and the second conductor 102 can be any suitable size, shape, and configuration as is known in the art without affecting the overall concept of the invention. For instance, in one embodiment the first conductor 104 may consist of a series of pads connected to the RFID chip, the shape of the pads being designed so that they can be coupled to an antenna by methods such as capacitance through a thin dielectric adhesive or by the use of a conductive adhesive and hence connect the RFID chip to the antenna. Suitable shapes depend on the number of pads and the nature of the antenna used. For instance, one suitable shape when two pads are utilized is a bow tie, which has two largely rectangular sections which are large enough to couple to an antenna capacitively or by other means of coupling. Furthermore, the bow tie shape also consists of tapered sections down towards the chip connections making it easier to attach a chip precisely to the pads. One of ordinary skill in the art will appreciate that the shape and size of the first conductor 104 and the second conductor 102 as shown in the figures are for illustrative purposes only and that many other shapes and sizes of the first conductor 104 and the second conductor 102 are well within the scope of the present disclosure. Although dimensions of the first conductor 104 and the second conductor 102 (i.e., length, width, and height) are important design parameters for good performance, the first conductor 104 and second conductor 102 may be any shape or size that ensures optimal performance during use.

Further, the chip 112, in one embodiment, may comprise a pair of conductive pads 110. The present invention also contemplates that the chip 112 may also use conductive bumps (not illustrated). However, the present invention is not limited to the utilization of conductive pads 110 and/or bumps in order to facilitate attachment of the chip 112 to the antenna 214. The RFID chip 112 is coupled to, or in communication with, a separate antenna 214 (shown in FIG. 2) on a base substrate 216 (shown in FIG. 2) to form RFID tag 200. The antenna 214 can be made of any suitable material as is known in the art, such as aluminum foil. The antenna 214 may be any type of antenna known in the art such as a dipole, sloop, etc. The base substrate 216 is typically comprised of a paper, including a recycled paper, but any other suitable material, such as plastic, including a recycled plastic, may also be used without affecting the overall scope of the invention.

Figure 3:
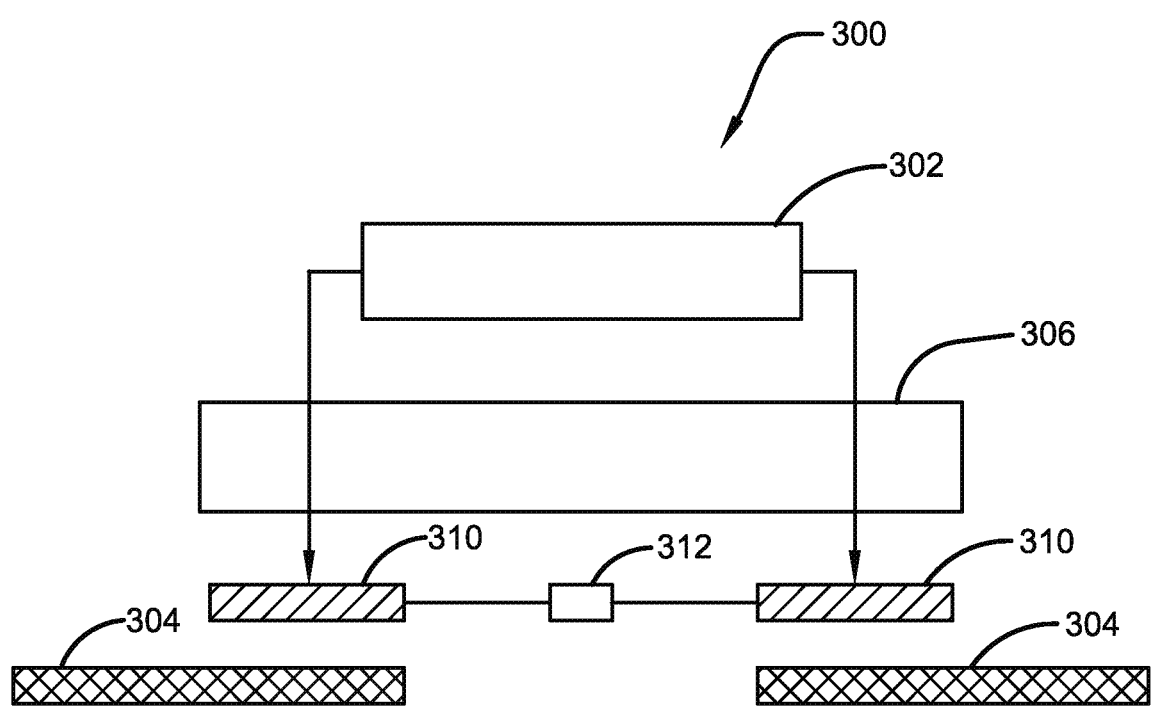
FIG. 3 illustrates a side perspective view of the RFID strap device with a second antenna formed on the top conductor in accordance with the disclosed architecture.

In another embodiment of the present invention shown in FIG. 3, an RFID strap device 300 comprises a top conductor 302 which may function as an antenna (the second antenna) and which is coupled to, or in communication with, a strap conductor 304 via a separating dielectric 306. The top conductor 302 may provide a path for frequencies that are different from a wanted operational frequency of the device. For example, the top conductor 302 may provide a path for frequencies of signals at 2.45 GHz, when the wanted operational frequency of the strap conductor 302 coupled to the antenna (not illustrated) is in the UHF band (e.g., generally 860 MHz-960 MHz, or, more particularly, 902 MHz-928 MHz in certain countries including the United States, China, and Japan, or alternatively, 865 MHz-868 MHz in certain other countries including the European Union, United Kingdom, and Russia) which prevents the interference from systems such as WiFi and Bluetooth, and, in the event of a strong signal, preventing damage to the RFID chip or creating a voltage high enough to cause a destructive arc.

The top conductor 302 may also perform other functions, such as acting as an inductor across the RFID strap pads and hence the RFID chip 312, in order to assist with matching between the chip 312 and the antenna (not illustrated), or a filter (i.e., a band pass and/or band stop), using a configuration of inductance and capacitance or a transmission line resonator such as twin line, specifically designed to enhance or suppress a range or frequencies. For example, passing 902 MHz to 928 MHz and suppressing adjacent signals, and in another example a GSM Base To Mobile transmission at 935 MHz to 960 MHz. The top conductor 302 may also support another device to enhance the filtering function, such as a Surface Acoustic Wave device, dielectric resonator, magnetic material with a frequency dependent adsorption of RF energy, dielectric materials with a frequency dependent adsorption, resistive materials designed to adsorb energy over a large frequency range, and transmission line elements such as microstrip, stripline or coplanar waveguide.

In another embodiment, the thickness of the conductor may be chosen such that its conductivity varies with frequency. For example, a conductor of 2.7 µm thickness has one skin depth at 915 MHz, and hence its RF resistance is close to its DC resistance; however, at 13.56 MHz, where the skin depth is 22 µm, the RF resistance is much higher than the DC resistance, so energy at 13.56 MHz passing through the 2.7 µm thick top conductor would be relatively adsorbed.

An additional use of the top conductor 302 is to make its electrical properties a function of a sensed property. For example, the presence of a liquid across a gap, where the changed properties of the top conductor 302 couple to the strap and antenna conductor as previously described, alters a parameter of the RFID tag, such as its sensitivity at a given frequency, in response to the sensed property.

In some embodiments, the separating dielectric 306 may be a plastic, such as PET, a paper, or a material with a relatively higher dielectric constant, for example in the range of 3 F/m to 10 F/m, such as a plastic incorporating a ceramic filler such as titanium dioxide, or any other suitable material as is known in the art. The strap conductor 304, in one embodiment, may also operate as an antenna (the first antenna). Specifically, the first antenna may be coupled to, or in communication with, a pair of pads 310 and an RFID chip 312 Thus, both top conductor 302 and strap conductor 304 act as antennas to add functionality to the RFID strap device 300.

Figure 4A:
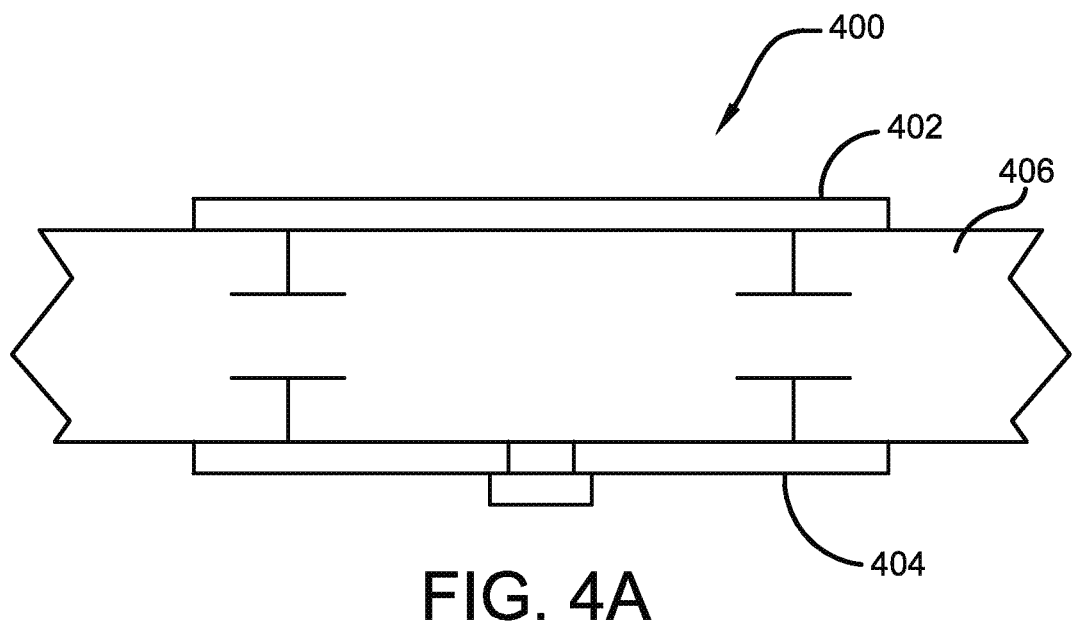
FIG. 4A illustrates a side perspective view of the RFID strap device wherein the top conductor is coupled to the bottom conductor via capacitance in accordance with the disclosed architecture.
Figure 4B:
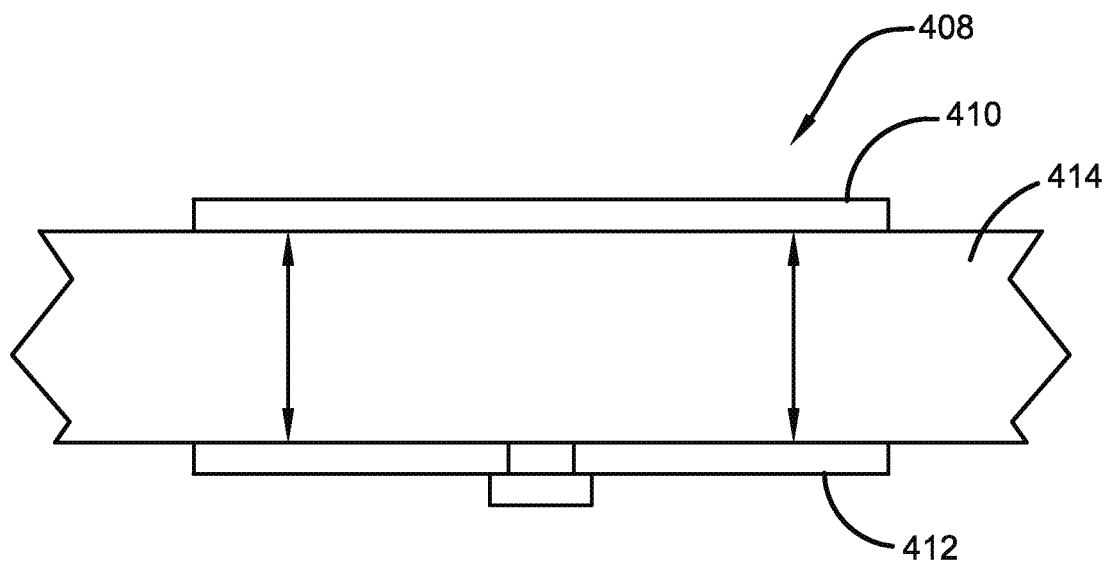
FIG. 4B illustrates a side perspective view of the RFID strap device wherein the top conductor is coupled to the bottom conductor via a crimp or ohmic contact in accordance with the disclosed architecture.

FIG. 4A illustrates an RFID strap device 400 comprised of a top conductor 402 that is coupled to a bottom conductor 404 via capacitance through a dielectric 406. And, FIG. 4B discloses an RFID strap device 408 comprised of a top conductor 410 coupled to a bottom conductor 412 using direct ohmic connection means 414. For example, the direct ohmic connection means 414 can be any other suitable means known in the art for forming a direct ohmic connection, including mechanical crimping, electrochemical processes, one or more holes filled with a conductive ink.

Figure 5A:
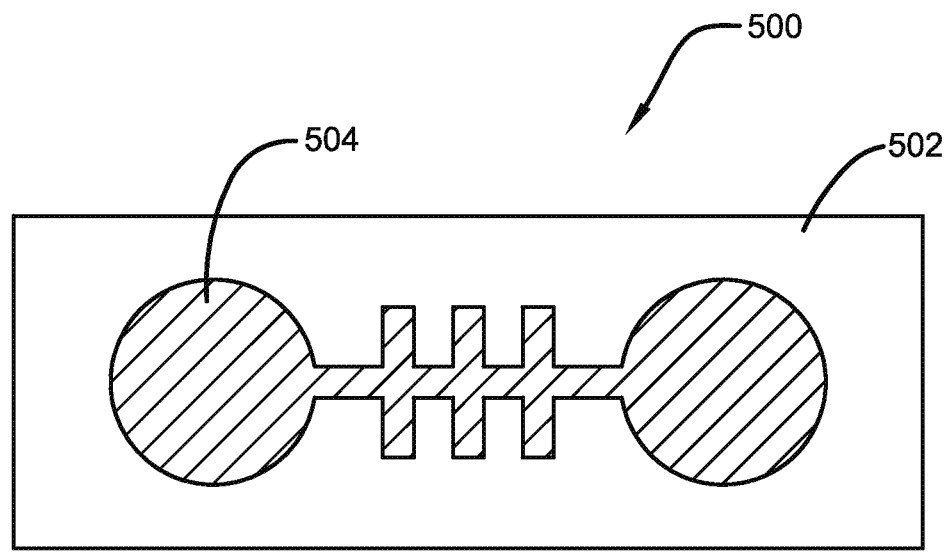
FIG. 5A illustrates a top perspective view of the RFID strap device wherein the top conductor acts as a second antenna in accordance with the disclosed architecture.
Figure 5B:
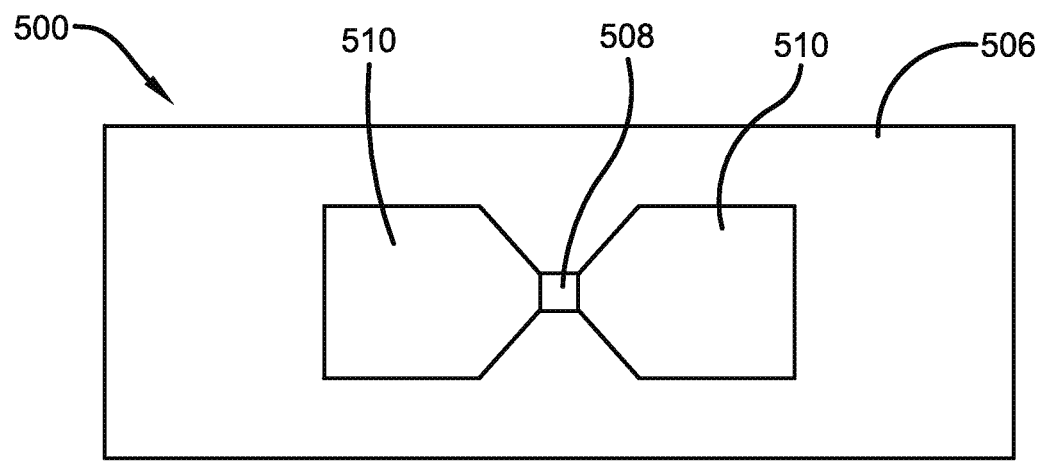
FIG. 5B illustrates a bottom perspective view of the RFID strap device wherein the bottom conductor is coupled to the strap and RFID chip in accordance with the disclosed architecture.

As shown in FIGS. 5A-B, RFID strap device 500 comprises a top conductor 502 which has a second antenna 504 formed thereon or attached thereto. The second antenna 504 may operate at a higher frequency than a first antenna coupled to the strap conductor 506. For example, the first antenna may operate in the range of 902-928 MHz and the second antenna 504 may operate in the range of 2400 MHz-2500 MHz. It is also contemplated that the second antenna 504 may operate at a lower frequency than a first antenna coupled to the strap 506. For example, the first antenna may operate in the range of 902-928 MHz and the second antenna 504 may operate at a frequency of, or adjacent to, 13.56 MHz. This second antenna 504 is also coupled to the RFID chip 508 and a pair of strap pads 510. This coupling can allow the RFID strap device 500 to communicate at a second (or higher) frequency than the first antenna and/or harvest energy to increase the performance of the RFID chip 508 at the frequency of the first antenna.

Figure 6A:
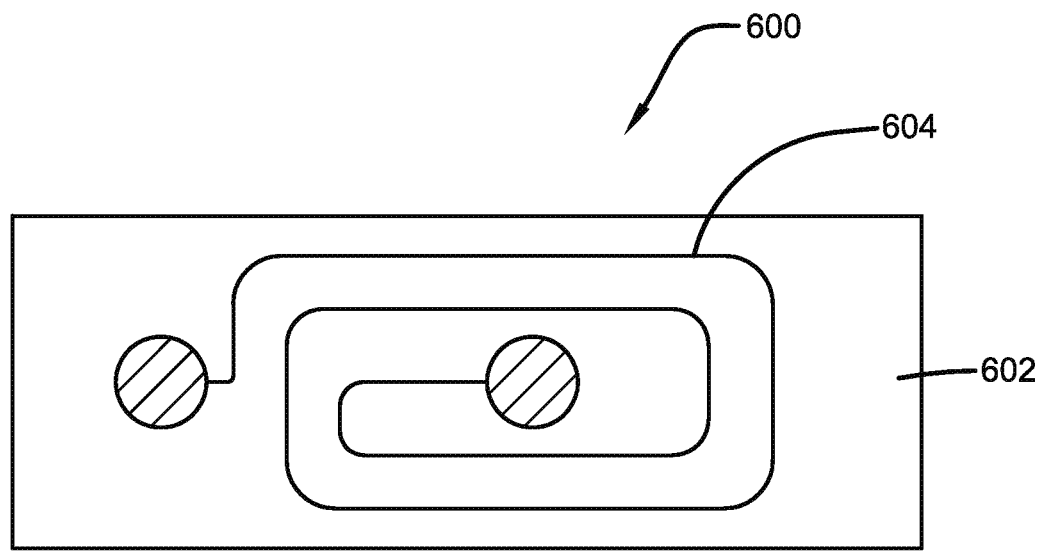
FIG. 6A illustrates a top perspective view of the RFID strap device with a coil type antenna on the top conductor in accordance with the disclosed architecture.
Figure 6B:
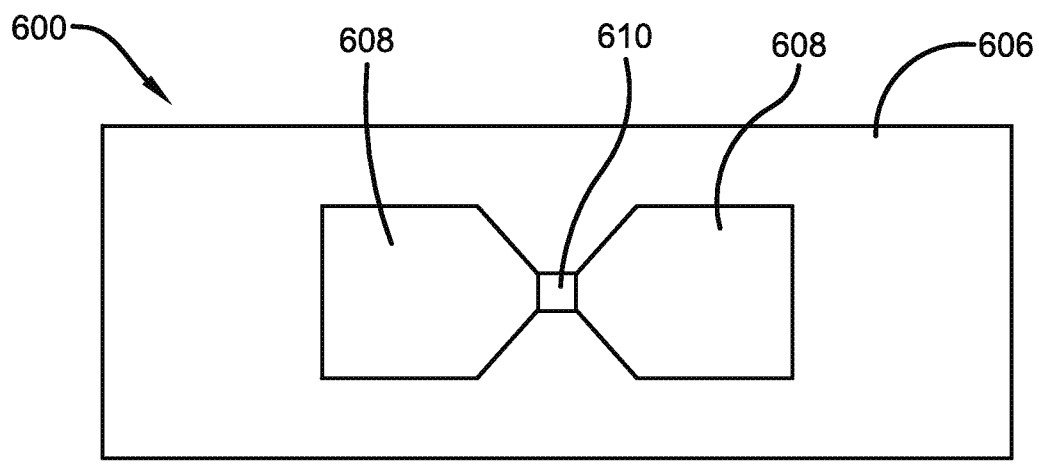
FIG. 6B illustrates a bottom perspective view of the RFID strap device wherein the bottom conductor is coupled to the strap and RFID chip in accordance with the disclosed architecture.

Additionally, as shown in FIGS. 6A-B, the RFID strap device 600 can comprise a top conductor 602 that has a second antenna 604 formed thereon, or attached thereto. The second antenna 604 can be a coil type antenna or any other suitable antenna as is known in the art. The second antenna 604 operates at a lower frequency than the first antenna (not illustrated) coupled to the strap conductor 606. This first antenna is coupled to the pair of strap pads 608 and RFID chip 610. As in FIG. 5, this coupling can allow operation of the RFID chip 610 at both frequencies (generated from the first antenna and second antenna 604) and also allows power to be harvested at the second frequency associated with the second antenna 604 on the top conductor 602.

Figure 7A:
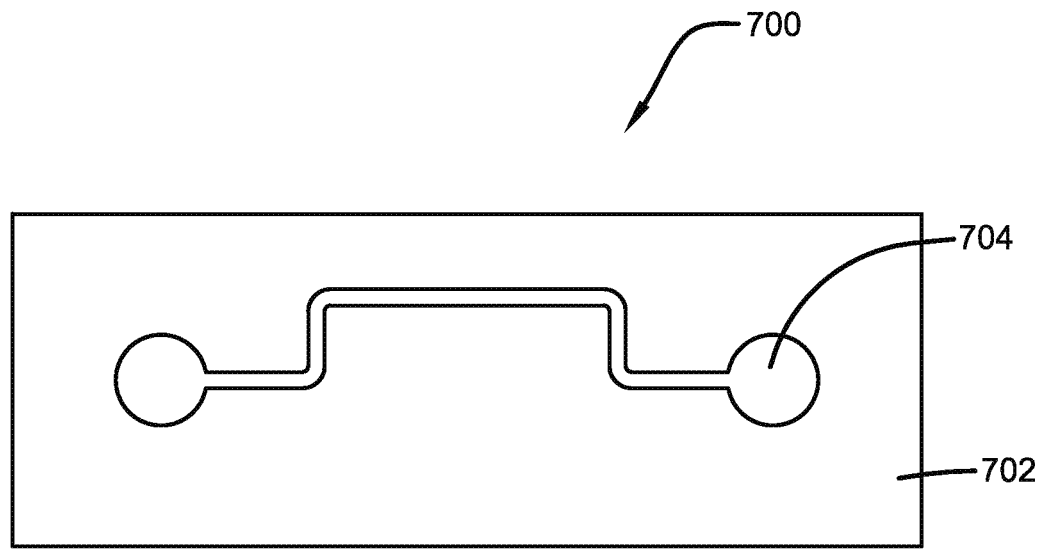
FIG. 7A illustrates a top perspective view of the RFID strap device wherein the top conductor is a dual function conductor which acts as a second antenna in the RFID strap device in accordance with the disclosed architecture.
Figure 7B:
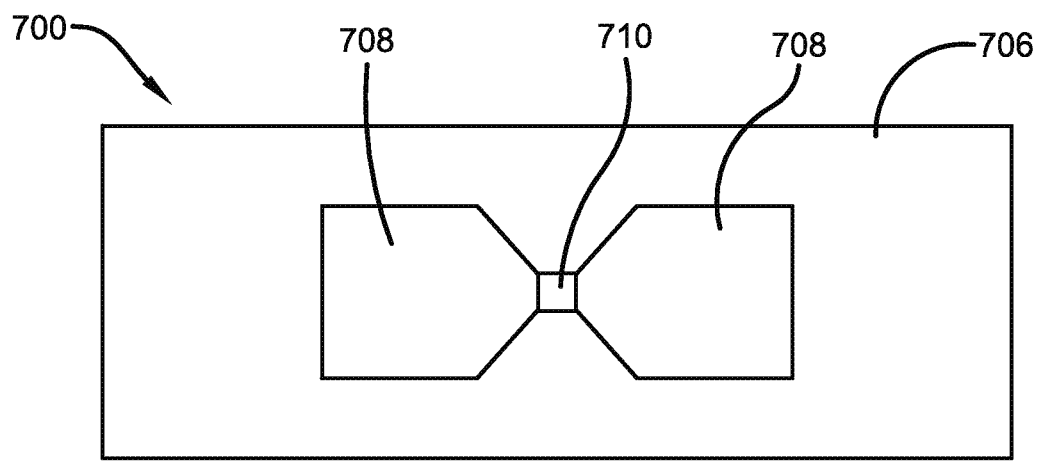
FIG. 7B illustrates a bottom perspective view of the RFID strap device wherein the bottom conductor is coupled to the strap and RFID chip in accordance with the disclosed architecture.

In an alternative embodiment shown in FIGS. 7A-B, the RFID strap device 700 comprises a dual function top conductor (or second conductor) 702 that operates as a second antenna 704. The top conductor 702/second antenna 704 has a dual function in that it operates at a different frequency than the first antenna (not illustrated), which is coupled to the pair of strap pads 708 and RFID chip 710, and also acts to improve the impedance match between the RFID chip 710 and the first antenna/strap conductor 706.

Figure 8A:
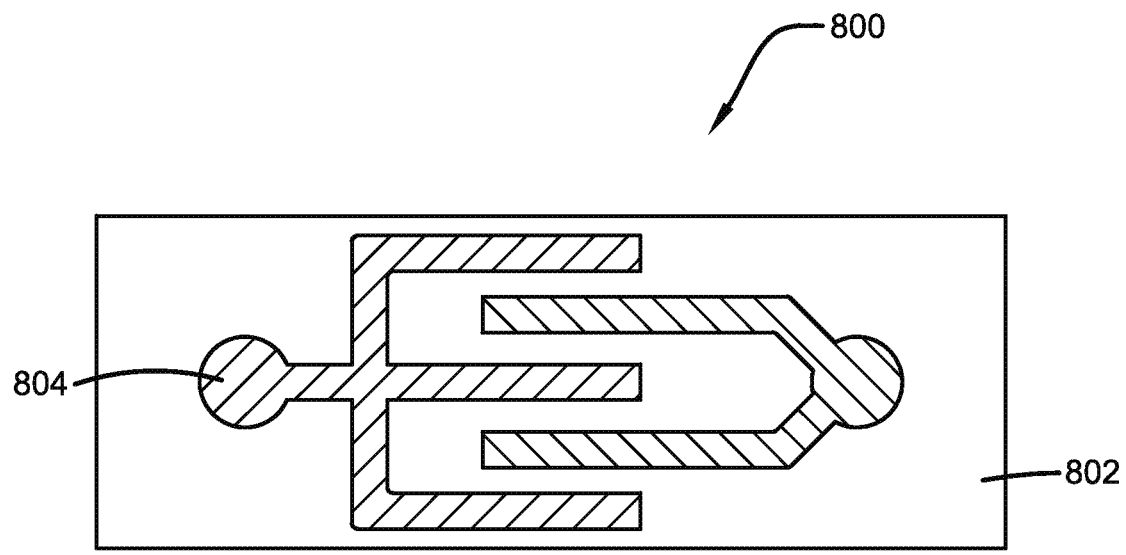
FIG. 8A illustrates a top perspective view of the RFID strap device wherein the top conductor comprises an interdigital sensing structure for sensing the presence of liquids or dielectrics in accordance with the disclosed architecture.
Figure 8B:
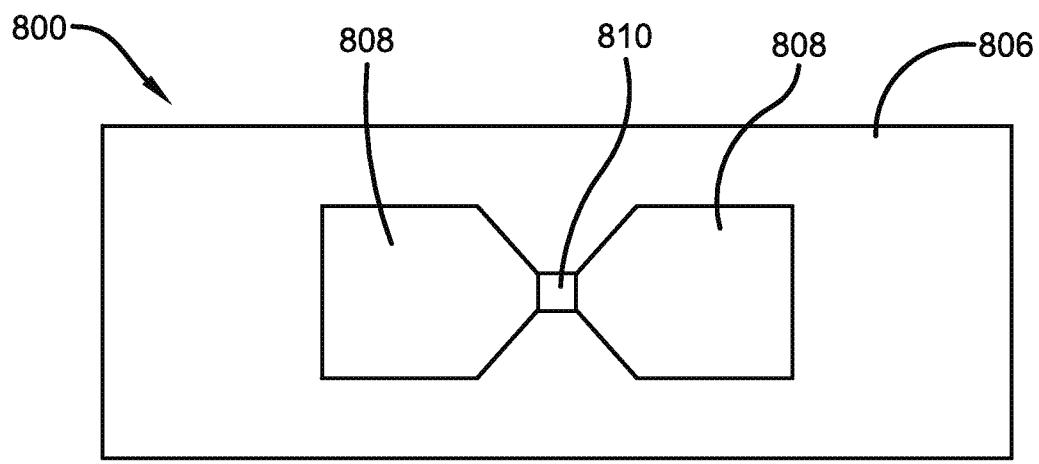
FIG. 8B illustrates a bottom perspective view of the RFID strap device wherein the bottom conductor is coupled to the strap and RFID chip in accordance with the disclosed architecture.

Additionally, as shown in FIGS. 8A-B, the RFID strap device 800 comprises a top conductor 802 coupled to a sensing device 804. This coupling forms an interdigital sensing structure to sense, for instance, but not limited to, the presence of liquids, dielectrics, or any sort of chemical. Further, the coupling between the sensing device 804 and the strap conductor 806 via the pair of strap pads 808 and the RFID chip 810 can alter the characteristics of the RFID strap device 800 function. For example, it may reduce the sensitivity, change the operating frequency, or change a digital bit in the RFID strap device 800 communication.

Figure 9A:
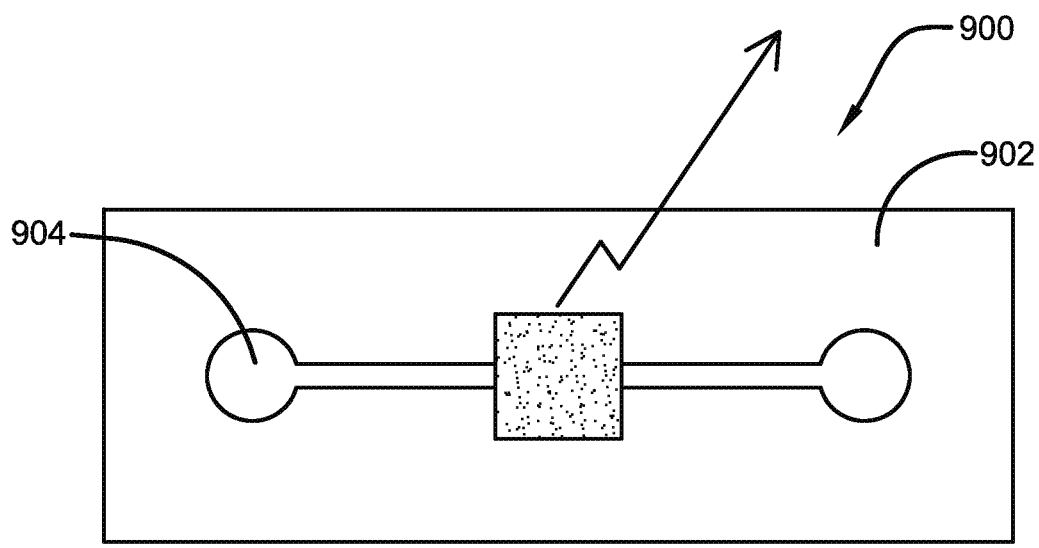
FIG. 9A illustrates a top perspective view of the RFID strap device wherein the top conductor comprises an emissive device in accordance with the disclosed architecture.
Figure 9B:
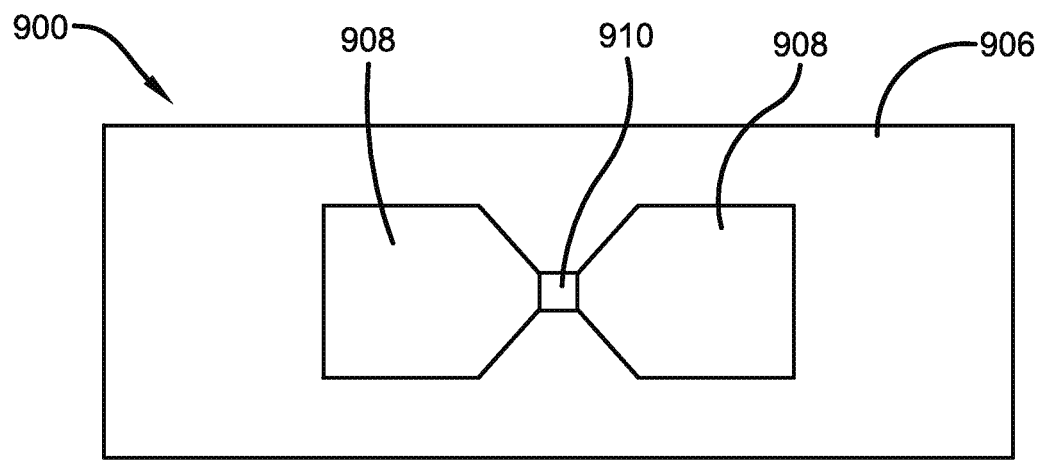
FIG. 9B illustrates a bottom perspective view of the RFID strap device wherein the bottom conductor is coupled to the strap and RFID chip in accordance with the disclosed architecture.

As shown in FIGS. 9A-B, RFID strap device 900 comprises a top conductor 902 which acts as part of an emissive device 904 and is coupled to the RFID strap device 900. Specifically, the emissive device 904 is coupled to the strap conductor 906 via the pair of strap pads 908 and RFID chip 910. The emissive device 904 can then act to drive an LED, or other suitable structure as is known in the art.

Figure 10A:
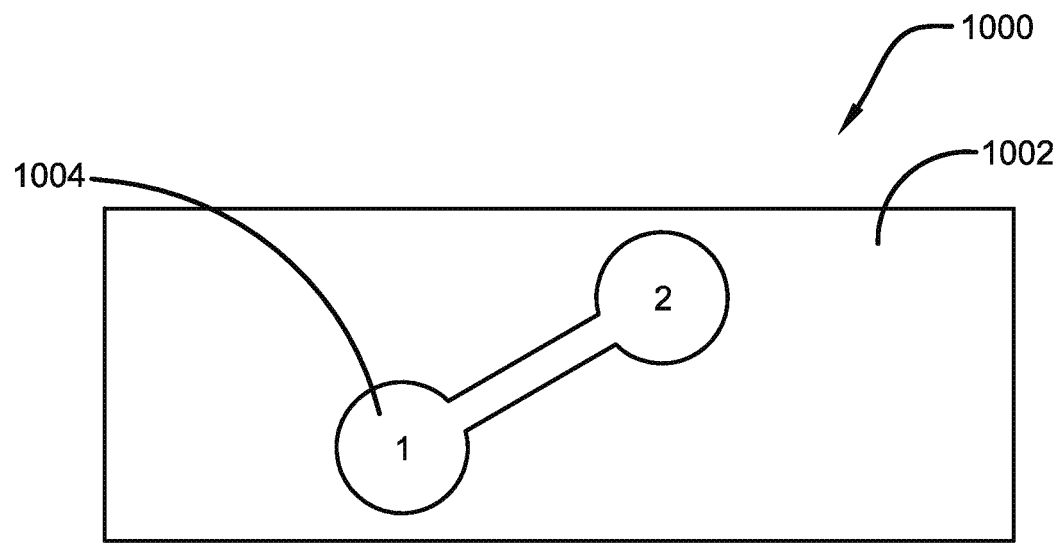
FIG. 10A illustrates a top perspective view of the RFID strap device wherein the top conductor functions as an antenna, a sensor interface, or an emissive device connection in accordance with the disclosed architecture.
Figure 10B:
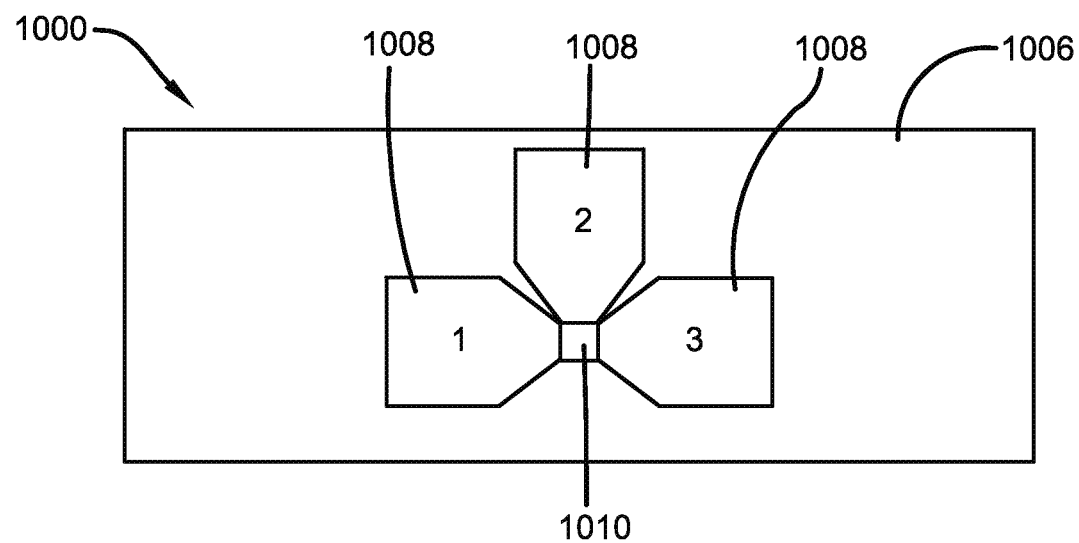
FIG. 10B illustrates a bottom perspective view of the RFID strap device wherein the bottom conductor is coupled to a multi-port strap and RFID chip in accordance with the disclosed architecture.

The embodiment shown in FIGS. 10A-B discloses a multi-port RFID strap device 1000 which comprises a top conductor 1002 functioning as a second antenna 1004. The top conductor 1002 is coupled to, or in communication with, one or more strap pads 1008 of a multi-port strap and RFID chip 1010 on the strap conductor 1006 of the multi-port RFID strap device 1000. The top conductor 1002 can then function as an antenna, a sensor interface, an emissive device connection, or other suitable device. Specifically, if the top conductor 1002 functions as the second antenna 1004, it can operate at a second frequency different from the strap conductor 1006/first antenna, so that the energy from the second antenna 1004 is coupled to an alternative strap pad 1008 on the multi-port RFID strap device 1000.

Figure 11A:
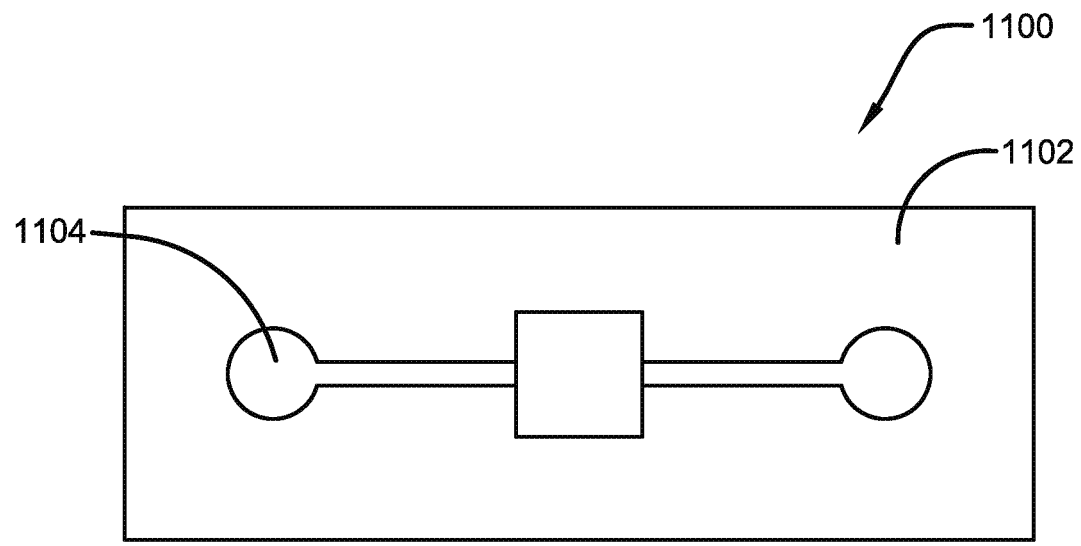
FIG. 11A illustrates a top perspective view of the RFID strap device wherein the top conductor comprises a semiconductor device in accordance with the disclosed architecture.
Figure 11B:
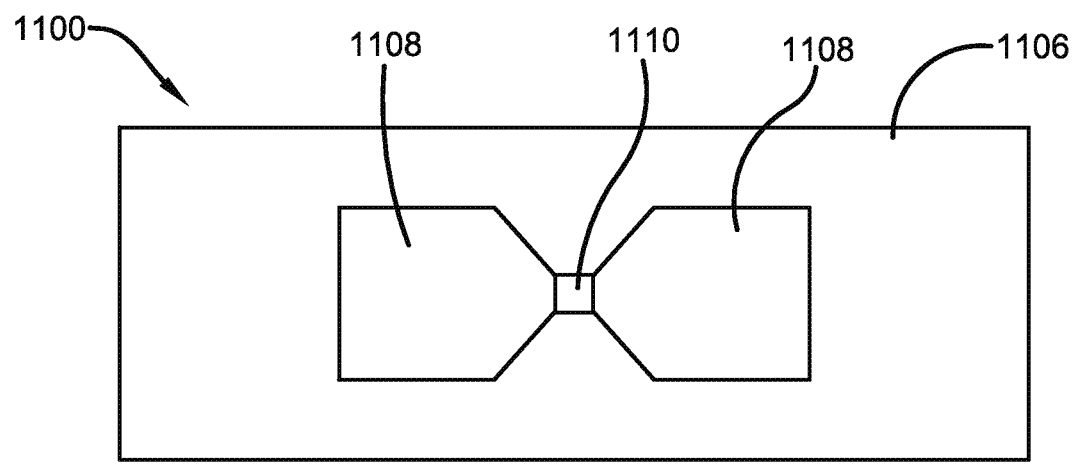
FIG. 11B illustrates a bottom perspective view of the RFID strap device wherein the bottom conductor is coupled to the strap and RFID chip in accordance with the disclosed architecture.

In an alternative embodiment shown in FIGS. 11A-B, the RFID strap device 1100 comprises a top conductor 1102 which is connected to a semiconductor device 1104 and then coupled to a strap conductor 1106. Specifically, the semiconductor device 1104 is coupled to the strap conductor 1106 via a pair of strap pads 1108 and RFID chip 1110. Further, the coupling to the RFID strap device 1100 via the pair of strap pads 1108 may provide such things as communication of data, power, clock frequencies, etc. In one embodiment, the semiconductor device 1104 may act as a Bluetooth beacon, where the 2.45 GHz transmission uses the top conductor 1102 as an antenna, and power or data received by the RFID strap device 1100 via the antenna will control and/or power the beacon. In a further embodiment, the top conductor 1102 may incorporate energy storage elements such as a battery or super-capacitor to power the RFID strap device 1100 or store energy to operate a sensor or other element.

FIGS. 12A-C illustrate another embodiment wherein the RFID strap device 1200 comprises a top conductor 1202 which is initially either un-patterned or only partially patterned. This top conductor 1202 can then be changed by any suitable method known to those of ordinary skill in the art to remove material, such as, but not limited to, using a laser beam to ablate away portions of the conductor 1202. Alternatively, mechanical means known to those of ordinary skill in the art can be used to ablate away portions of the conductor 1202. The cutting can produce structures 1204 as previously described, such as a secondary antenna or sensor interface area; however, as the strap conductor 1206 may be attached (coupled) to the antenna via the pair of strap pads 1208 and RFID chip 1210, the cutting may be in response to a measurable parameter, such as peak operating frequency, allowing adjustment of the frequency, either to deal with manufacturing tolerances or adjust the operating frequency of the RFID strap device 1200.

Figure 13A:
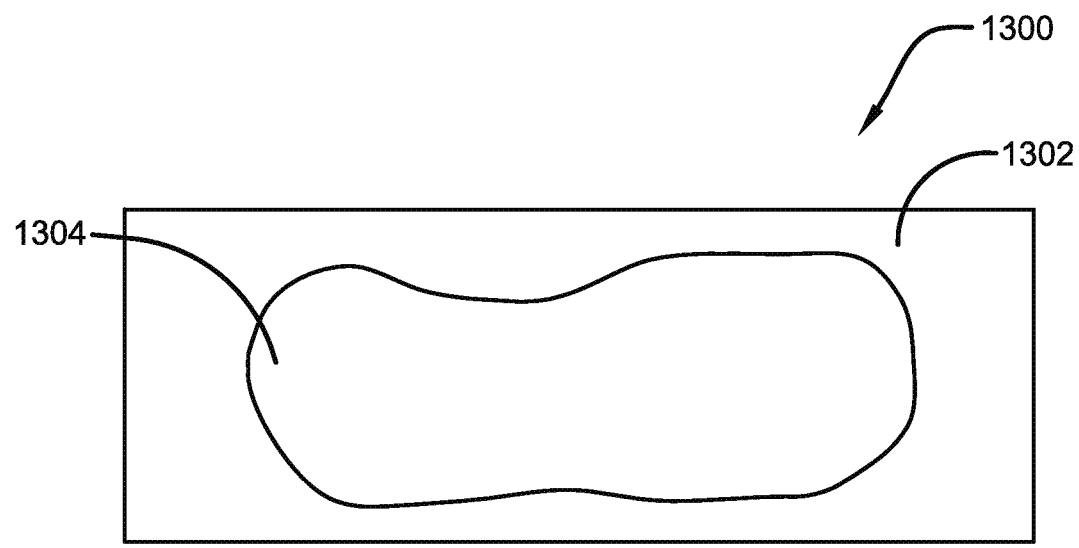
FIG. 13A illustrates a top perspective view of the RFID strap device wherein the top conductor is a printed conductor area on the top surface of the RFID strap in accordance with the disclosed architecture.
Figure 13B:
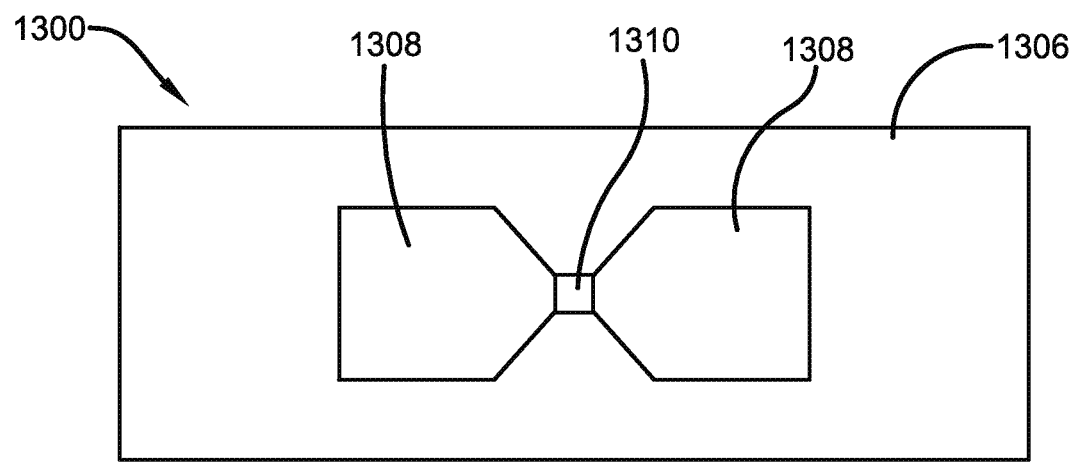
FIG. 13B illustrates a bottom perspective view of the RFID strap device wherein the bottom conductor is coupled to the strap and RFID chip in accordance with the disclosed architecture.

FIGS. 13A-B illustrate another embodiment wherein the RFID strap device 1300 comprises a top conductor 1302 which comprises a printed conductor area 1304 which is printed with conductive ink. In some embodiments, the conductive ink contains silver, copper or graphene. Any other suitable conductive ink known to those of ordinary skill in the art may be used without departing from the scope of the present disclosure. The printed conductor area 1304 and top conductor 1302 are coupled to the strap conductor 1306. Specifically, the printed conductor area 1304 is coupled to the strap conductor 1306 via the pair of strap pads 1308 and RFID chip 1310. The printed conductor area 1304 may be applied to the RFID strap device 1300 prior to attachment of the strap or post-attachment using any suitable means, such as inkjet, screen printing, flexographic printing or gravure printing. The printed conductor area 1304 can be used in any of the ways previously described above, for example, as a secondary antenna or sensor interface area.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio-frequency identification (RFID) tag comprising:
    a RFID strap device comprising
        a first bottom strap conductor comprising a pair of strap pads and an RFID chip;
        a second top conductor;
        a dielectric positioned between the first bottom strap conductor and the second top conductor; and
    a separate antenna coupled to the RFID chip, wherein the RFID chip comprises conductive pads or conductive bumps which facilitate attachment of the RFID chip to the antenna.

2. The RFID tag of claim 1, wherein the antenna is located on a base substrate.

3. The RFID tag of claim 1, wherein the antenna operates at a first frequency.

4. The RFID tag of claim 3, wherein the second conductor functions as a second antenna.

5. The RFID tag of claim 4, wherein the second antenna operates at a frequency that differs from the first frequency.

6. The RFID tag of claim 1, wherein the second conductor is coupled to the first strap conductor via capacitance through the dielectric.

7. The RFID tag of claim 1, wherein the second conductor is coupled to the first strap conductor via direct ohmic connection means.

8. The RFID tag of claim 7, wherein the direct ohmic connection means include mechanical crimping, electrochemical processes, or one or more holes filled with conductive ink.

9. A radio-frequency identification (RFID) strap device coupled to a first antenna comprising:
    a first bottom strap conductor comprised of a pair of strap pads connected to an RFID chip;
    a second top conductor comprised of a second antenna; and
    a dielectric positioned between the first bottom strap conductor and the second top conductor, wherein the second antenna is configured to operate at a frequency different than the first antenna and wherein the first antenna is coupled to the first bottom strap conductor via the pair of strap pads and the RFID chip.

10. The RFID strap device of claim 9, wherein the second antenna increases impedance match between the RFID chip and the first antenna.

11. The RFID strap device of claim 9, wherein the second conductor is coupled to a sensing device.

12. The RFID strap device of claim 9, wherein the second conductor is coupled to an emissive device.

13. The RFID strap device of claim 9, wherein the second conductor is coupled to a semiconductor device.

14. The RFID strap device of claim 9, wherein the second conductor is printed with conductive ink.

15. A method of incorporating a second conductor into a radio-frequency identification (RFID) strap device comprising:
    providing a first bottom strap conductor comprised of a pair of strap pads;
    connecting an RFID chip to said pair of strap pads;
    positioning a dielectric between the first bottom strap conductor and the second top conductor; and
    coupling the RFID chip to an antenna, wherein the RFID chip comprises conductive pads or conductive bumps which facilitate attachment of the RFID chip to the antenna.

16. The method of claim 15, further comprising forming a second antenna on the second conductor.

17. The method of claim 16, further comprising operating the second antenna at a frequency different than the antenna.

18. The method of claim 15, further comprising coupling the second conductor to a sensing device.

19. The method of claim 15, further comprising coupling the second conductor to an emissive device.

* * * * *